UNITED STATES PATENT OFFICE.

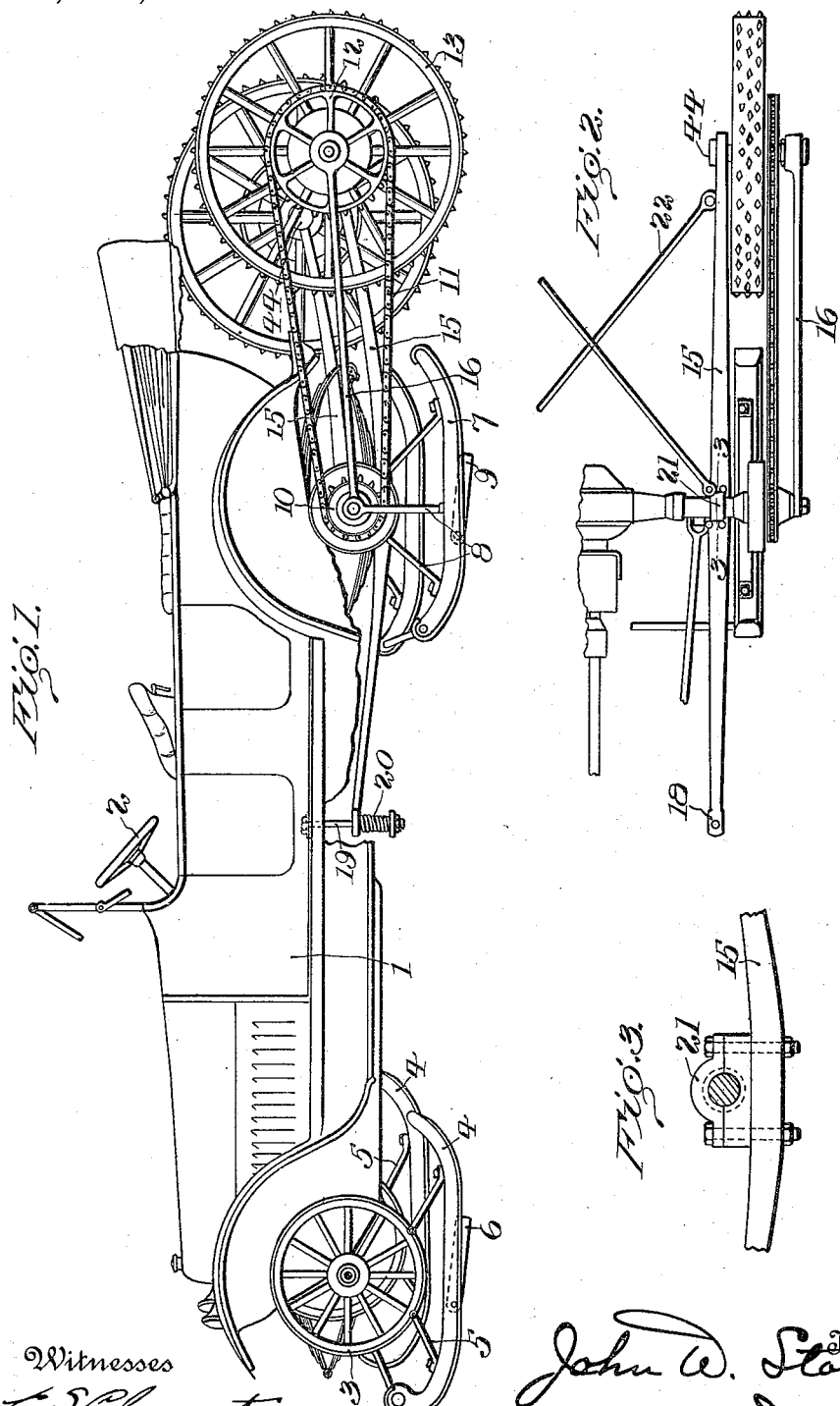

JOHN W. STOBIE, OF MADISON, MAINE.

MOTOR-DRIVEN SLEIGH.

1,156,110.  Specification of Letters Patent.  Patented Oct. 12, 1915.

Application filed March 16, 1915. Serial No. 14,785.

*To all whom it may concern:*

Be it known that I, JOHN W. STOBIE, a citizen of the United States, residing at Madison, Somerset county, and State of Maine, have invented and discovered certain new and useful Improvements in Motor-Driven Sleighs, of which the following is a specification.

This invention relates to improvements in sleigh attachments for automobiles, and more particularly to the driving mechanism thereof, and it is the primary object of the invention to provide for the operative maintenance of the driving wheels in engagement with the snow or ice surface, regardless of variations in the surface, and to permit vertical vibratory movements of the driving wheels incident to such variations.

With this and further objects in view, as will in part hereinafter be stated and in part become apparent, the invention comprises certain novel constructions, combinations and arrangements of the parts, as subsequently specified and later pointed out in the claims.

In the accompanying drawing, Figure 1 is a perspective view of an automobile having applied thereto sleigh attachments embodying features of the present invention, Fig. 2 a detailed, fragmentary plan view of the driving connections, the car body being omitted, and Fig. 3 a vertical section taken on the plane indicated by line 3—3 of Fig. 2.

Referring to the drawing by numerals, 1 indicates an automobile structure of the ordinary type, provided with the usual steering apparatus (not illustrated), and controlled by a steering wheel 2, by which the front wheels 3 of the car structure are adapted to be shifted. Anchored to the wheels 3 is the forward sled, consisting of sleigh runners 4, 4, connected by rods 5, 5 with the wheels 3, and connected together by cross-rods, or other appropriate securing means. Non-skidding knife-like plates 6 are pivotally carried by the runners 4 to swing in longitudinal slots in the runners, and adapted for entering edgewise into the snow or ice surface on which the runners 4 are sliding, for preventing sidewise movement of the runners during operation.

The rear wheels of the automobile are removed, and to the load-carrying axle is fixed the rear sled, consisting of runners 7 appropriately cross-connected and connected with the said load-carrying axle by braces 8. Non-skidding plates 9 are also employed with the runners 7.

Fixed to the respective ends of the live axle are sprocket wheels 10, each engaged by a sprocket chain 11 extending rearwardly and engaging a sprocket 12 fixed to a tractor or driving wheel 13. Each driving wheel 13 is journaled on a stub axle 14, carried by a compensating lever 15, engaging the respective axle 14 at its inner end. A radius rod 16 engages the outer end of each axle 14 and extends to and is provided with a journal bearing on the live axle of the automobile. Lugs or spurs 17 project radially from the periphery of each wheel 13 to enable the wheel to secure an effective purchase in the snow or ice on which it is running.

Each lever 15 extends from its stub shaft 14 forwardly to a point approximately midway of the length of the car body, and at its forward end is provided with an eye 18, engaging a rod 19, fixed to and depending from the chassis of the car. A coiled spring 20 surrounds the lower portion of each rod 19 and supports the forward end of the respective lever 15, the spring being sustained by locking nuts engaging the lower end of rod 19. Intermediate of its ends, and approximately midway of its length, each lever 15 is pivotally connected to the load-carrying axle of the automobile, after the manner best seen in Fig. 3. This pivotal connection may assume any of various forms, that shown being simple and effective and consisting of a collar 21 surrounding the axle and bolted or otherwise fixed to the respective lever 15. Rear portions of the two levers 15 are connected by cross-trussing rods, or stays, 22, whereby the levers 15 are held against lateral separation or approach, and the wheels 12 are, nevertheless, left sufficiently independent for vertical vibratory movement incident to variations in the surface of the roadway.

The operation of the structure, it is thought will be apparent and as may be briefly stated, will consist in operating the enginery of the automobile in the usual manner and steering by the use of wheel 2 in the ordinary way. Power is delivered through the live axle to the chains 11 and thence to the wheels 13, so that the car is propelled, and it is, of course, clear that the ratio of sprockets 10 to sprockets 12 may be proportioned incident to the amount of power to be delivered and the speed desired. In the course of running along the roadway, if either of the wheels 13 strikes an elevated place, it will merely be lifted thereby and will move up and over the elevation and descend to its normal operative position without varying the action of the other drive wheel 13 and without impairing its operation so far as driving is concerned. The upward movement will be accompanied by a proportional downward movement of the forward end of the respective lever 15, which movement is resisted by the spring 20. The spring 20 thus tends to restore the parts to their normal position after the wheel has passed over such an elevation. When one of the drive wheels 13 descends into a depression in the roadway, it will drop to the lower position accompanied by a proportional swinging of the respective lever 13 acting under the force of spring 20, said spring elevating the forward end and, of course, proportionately lowering the rear end of the lever, and when the respective drive wheel is moving out of the depression, the resulting elevation of the rear end of the lever will swing the lever on its pivotal connection with the axle, and thus depress its forward end and proportionately depress spring 20. Accordingly, the two drive wheels, or tractors, 13 are maintained in constant operative engagement with the surface of the roadway without appreciable jarring or vibration being delivered to the occupants of the automobile.

One of the advantages of the present invention resides in the fact that there is no opportunity afforded for the engine of the automobile to "race" at any time incident to relief from strain due to the action of the differential when one of the traction wheels happens to fail to remain in contact with the roadway, for the simple reason that both the wheels 13 are constantly maintained in operative contact with the roadway.

Having thus fully described my said invention, what I claim as new and desire to secure by Letters Patent, is:

1. The combination, with an automobile with sled runners sustaining the same, of a tractor for driving the automobile, means pivotally connecting the tractor to the axle of the automobile, means for delivering power from the automobile to the tractor for actuating the latter, a lever pivotally connected to the tractor and fulcrumed on the axle of the automobile and extending forwardly therefrom, and a cushioned connection between the forward end of the lever and the automobile, substantially as set forth.

2. The combination, with an automobile with sled runners sustaining the same, of a tractor for driving the automobile, means pivotally connecting the tractor to the axle of the automobile, means for delivering power from the automobile to the tractor for actuating the latter, a lever pivotally connected to the tractor and fulcrumed on the axle of the automobile and extending forwardly therefrom, the forward end of the lever being formed with an eye, a rod connected with the automobile and extending through the eye, and a cushion carried by the rod and engaging the forward end of the lever tensioned to resist depression of such forward end, substantially as set forth.

3. The combination, with an automobile and sled runners sustaining the same, of a radius rod having a journal connection with each end of the live axle of the automobile and extending thence rearwardly, a stub axle carried by each radius rod, a traction wheel journaled on each stub axle, means for delivering power from the live axle of the automobile to each traction wheel, a counterbalance lever pivoted to the inner end of each stub axle and extending forwardly therefrom and fulcrumed intermediate its ends to the load-carrying axle of the automobile, and a movable connection between the forward end portion of each lever and the automobile, substantially as set forth.

In witness whereof, I have hereunto set my hand and seal at Madison, Maine, this 9th day of March, A. D. nineteen hundred and fifteen.

JOHN W. STOBIE. [L. S.]

Witnesses:
  E. W. ADAME,
  RUFUS S. MCKENNEY.

Copies of this patent may be obtained for five cents each, by addressing the "Commissioner of Patents. Washington, D. C."